United States Patent
Kasamatsu (10) Patent No.: US 12,540,778 B2
(45) Date of Patent: Feb. 3, 2026

(54) HEAT EXCHANGER

(71) Applicant: RINNAI CORPORATION, Aichi (JP)

(72) Inventor: Kei Kasamatsu, Aichi (JP)

(73) Assignee: RINNAI CORPORATION, Aichi (JP)

( * ) Notice: Subject to any disclaimer, the term of this patent is extended or adjusted under 35 U.S.C. 154(b) by 120 days.

(21) Appl. No.: 18/584,060

(22) Filed: Feb. 22, 2024

(65) Prior Publication Data

US 2024/0328725 A1 Oct. 3, 2024

(30) Foreign Application Priority Data

Mar. 29, 2023 (JP) .................. 2023-053936

(51) Int. Cl.
*F28F 1/32* (2006.01)

(52) U.S. Cl.
CPC .......... *F28F 1/325* (2013.01); *F28F 2275/04* (2013.01)

(58) Field of Classification Search
CPC .......... F28F 1/32; F28F 1/325; F28F 2275/04; B23K 1/0012; B23K 2101/14
See application file for complete search history.

(56) References Cited

U.S. PATENT DOCUMENTS

2018/0106498 A1 4/2018 Nishino et al.
2025/0052519 A1* 2/2025 Jeong ............. F28F 1/325

FOREIGN PATENT DOCUMENTS

| JP | 2001153468 A | * | 6/2001 |
| JP | 2011144979 A | * | 7/2011 |
| JP | 2018-063089 A | | 4/2018 |
| JP | 2018080866 A | * | 5/2018 |

* cited by examiner

*Primary Examiner* — Eric S Ruppert
(74) *Attorney, Agent, or Firm* — Future IP LLC; Tomoko Nakajima (57) ABSTRACT

In a heat exchanger that includes heat-absorbing fins and heat-absorbing tubes, each of which pierces through a corresponding through hole formed by a burring process, when a brazing material held by each of brazing material holding portions is positioned above a corresponding missing portion, formed by removing a part of a burring wall of each of the through holes, melts and penetrates between each of the burring walls and the corresponding heat-absorbing tube, each of the brazing material holding portions is extended above the corresponding missing portion at a predetermined distance. A notched portion concaved downward is positioned on each side of the respective brazing material holding portions.

3 Claims, 7 Drawing Sheets

HEAT EXCHANGER

TECHNICAL FIELD

The invention relates to a heat exchanger to be heated by a heating fluid, which includes a rectangular cylindrical casing through which the heating fluid flows inside; on a premise that two orthogonal directions, intersecting a flow direction of the heating fluid within the casing, are defined as an X-axis direction and a Y-axis direction, respectively; a plurality of heat-absorbing fins stacked and arranged in the X-axis direction inside the casing; and a plurality of heat-absorbing tubes piercing through each of the heat-absorbing fins in the X-axis direction and through side plates on both sides in the X-axis direction of the casing, and through which a fluid to be heated flows inside.

BACKGROUND ART

Originally, in this type of the heat exchangers, through holes that are opened in each of the heat-absorbing fins and through each of which a corresponding heat-absorbing tube pierces are configured by a burring processed hole with which a burring wall protruding in the X-axis direction from a hole edge of each of the through holes is provided. Each of portions positioned at one side on both of upstream and downstream sides in the flow direction of the heating fluid of the respective through holes is formed into a missing portion at which a part of the burring wall has been removed. In addition, each of the heat-absorbing fins is provided with brazing material holding portions that hold a brazing material, and each of which is positioned adjacent to the corresponding missing portion in the flow direction of the heating fluid. And then, at the time causing the brazing material to be molten under a condition where each of the brazing material holding portions is positioned above the corresponding through hole, each of the heat-absorbing fins and the corresponding heat-absorbing tube are intended to be brazed at the burring wall by allowing the molten brazing material flowing from of the respective brazing material holding portions to penetrate between each of the burring walls and the corresponding heat-absorbing tube through the respective missing portions.

Here, conventionally, the heat exchanger in which each of the brazing material holding portions, under a condition making each of the brazing material holding portions position above the corresponding through hole, is formed so as to concave downward in an arc towards the respective through holes has been known (See Patent Document No. 1, for example).

REFERENCE

Patent Document No. 1: JP2018-63089 A

SUMMARY OF INVENTION

Technical Problem

Regarding the aforementioned heat exchanger, while the brazing material can be securely held in each of the brazing material holding portions, it has been revealed that the following inconvenience takes place. Specifically, when the molten brazing material flows down from each of the brazing material holding portions along a side surface of the respective heat-absorbing fins, there is a tendency for the molten brazing material to flow with a directional component away in a normal direction of an edge of each of the brazing material holding portions from the edge of the respective brazing material holding portions. Therefore, the molten brazing material flowing from the side edge on each side of the Y-axis direction, which stands up from a bottom portion of each of the brazing material holding portions concaved in the arc, flows with a direction away from the side edge on each side of the Y-axis direction of the respective brazing material holding portions, i.e., with a directional component towards outer sides in the Y-axis direction, thereby becoming difficult for the molten brazing material to flow down into each of the missing portions. As a result, a proportion of the molten brazing material flowing down into each of the missing portions decreases, and the consumption of the brazing material will have to be risen, leading to a factor rising in costs.

In the light of the aforementioned problem, the invention provides a heat exchanger which causes the proportion of the molten brazing material flowing down into each of the missing portions to rise, thereby possibly being designated to make cost reduction.

Solution to Problem

In order to solve the aforementioned problem, the invention presupposes a heat exchanger to be heated by a heating fluid; which includes a rectangular cylindrical casing through which the heating fluid flows inside; on a premise that two orthogonal directions, intersecting a flow direction of the heating fluid within the casing, are defined as an X-axis direction and a Y-axis direction, respectively; a plurality of heat-absorbing fins stacked and arranged in the X-axis direction inside the casing; and a plurality of heat-absorbing tubes piercing through each of the heat-absorbing fins in the X-axis direction and through side plates on both sides in the X-axis direction of the casing, and through which a fluid to be heated flows insides, wherein through holes that are opened in each of the heat-absorbing fins and through each of which a corresponding heat-absorbing tube pierces are configured by a burring processed hole with which a burring wall protruding in the X-axis direction from a hole edge of each of the through holes is provided, wherein each of portions positioned at one side on both of upstream and downstream sides in the flow direction of the heating fluid of the respective through holes is formed into a missing portion at which a part of the burring wall has been removed, wherein each of the heat-absorbing fins is provided with brazing material holding portions that hold a brazing material, and each of which is positioned adjacent to the corresponding missing portion in the flow direction of the heating fluid, and wherein at the time causing the brazing material to be molten under a condition where each of the brazing material holding portions is positioned above the corresponding through hole, a molten brazing material flowing down from each of the brazing material holding portions is permitted to penetrate between each of the burring walls and corresponding of the heat-absorbing tube through the respective missing portions. In the heat exchanger, each of the brazing material holding portions, under the condition where each of the brazing material holding portions is positioned above the corresponding through hole, is formed to hold the brazing material with an almost overall width in the Y-axis direction by causing to be extended above the corresponding missing portion at a predetermined distance, each of the heat-absorbing fins is provided with a notched portion positioned on each side in the Y-axis direction of the respective brazing material holding portions, and the notched portion, under the condition where each of the brazing material holding portions is positioned above the corresponding through hole, is configured to concave downward beneath the corresponding brazing material holding portion and portions of each of the heat-absorbing fins adjacent on outer sides in the Y-axis direction of the respective notched portions.

According to the invention, the molten brazing material flowing down from each side portion in the Y-axis direction of the respective brazing material holding portions has the directional component away from the side edge on each side of the respective notched portions, i.e., the directional component towards the inner side of the Y-axis direction. Therefore, the molten brazing material flowing down from each side portion in the Y-axis direction of the respective brazing material holding portions also approaches just below a central part in the Y-axis direction of each of the brazing material holding portions. As a result, the proportion of the molten brazing material flowing down into the corresponding missing portion positioned beneath each of the brazing material holding portions increases. Accordingly, the cost reduction can be designated by reducing the consumption of the brazing material.

In addition, in the invention, it is desirable for a continuous surface which continues and is twisted over a side surface in the Y-axis direction of each of the burring walls, which faces to the corresponding missing portion from a circumferential surface portion opposite to a peripheral surface of each of the heat-absorbing tubes at the corresponding missing portion, to be present at a corner portion on each side in the Y-axis direction of the corresponding missing portion. Here, as particularly described below, a concaved notched portion, which isolates the aforementioned circumferential surface portion of each of the through holes from the aforementioned side surface in the Y-axis direction of each of the burring walls, is usually formed at a corner portion on each side in the Y-axis direction of the respective missing portions. However, this leads to a part of the molten brazing material, which has flowed down into each of the missing portions, enters and remains the concaved notched portion, and the quantity of the molten brazing material penetrating between each of the burring walls and the corresponding heat-absorbing tube is reduced. On the contrary, with the aforementioned twisted continuous surface and without forming the concaved notched portion at the corner portion on each side in the Y-axis direction of the respective missing portions, the reduction in the quantity of the molten brazing material penetrating between each of the burring walls and the corresponding heat-absorbing tube, caused by the flow into the concaved notched portion, is prevented, offering an advantage.

In addition, in the invention, it is desirable for a width in the Y-axis direction of each of the missing portions is narrower than that of each of the brazing material holding portions. Here, in a case where the Y-axis direction does not become horizontal but is inclined during brazing, the molten brazing material, which has flowed down into each of the missing portions, is biased towards a downhill grade side. On the other hand, in a case where the width in the Y-axis direction of each of the missing portions is wider than that of each of the brazing material holding portions, the molten brazing material deviates from each of the burring walls adjacent on an uphill grade side of the respective missing portions. This results in the molten brazing material failing to penetrate between each of the burring walls and the corresponding heat-absorbing tube, leading to a brazing defect. On the contrary, in the case where the width in the Y-axis direction is narrower, as aforementioned, the brazing defect brought about by the molten brazing material leaving each of the burring walls adjacent on the uphill grade side of the respective missing portions can be suppressed.

DESCRIPTION OF EMBODIMENTS

Figure 1:
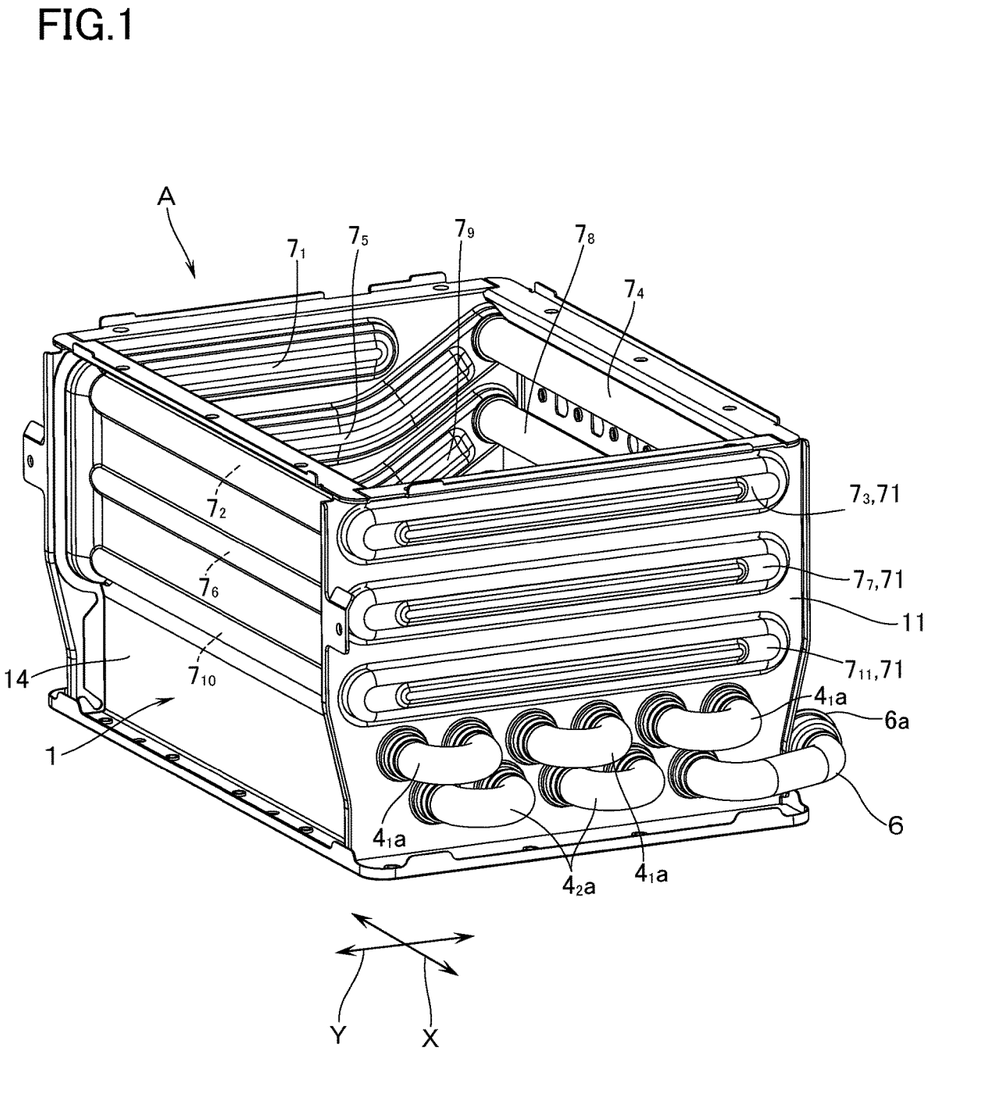
FIG. 1 is a perspective view of a heat exchanger of an embodiment of the invention.
Figure 2:
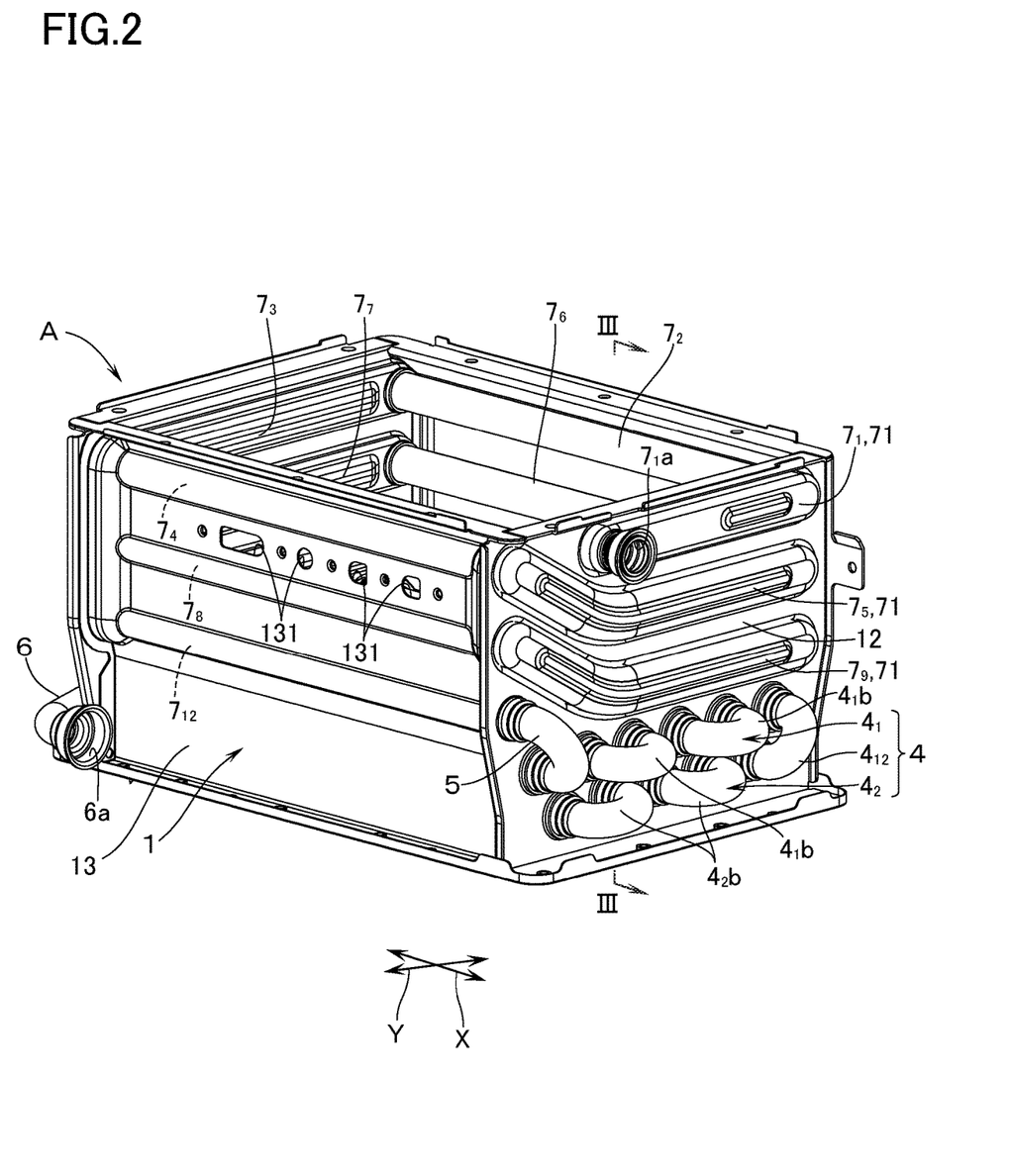
FIG. 2 is a perspective view of the heat exchanger of the embodiment, viewed from an opposite direction to FIG. 1.
Figure 3:
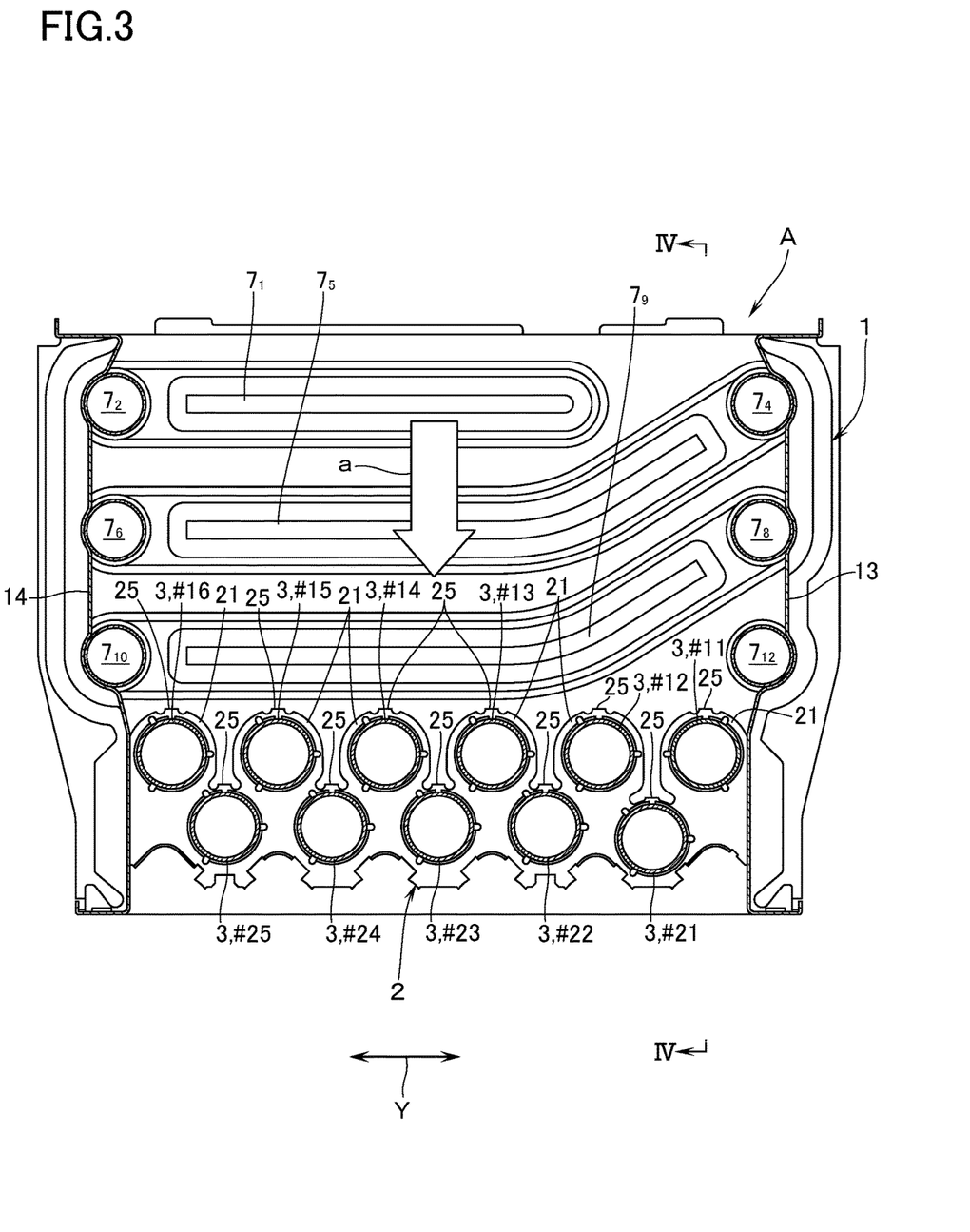
FIG. 3 is a section cut along a III-III line of FIG. 2.
Figure 4:
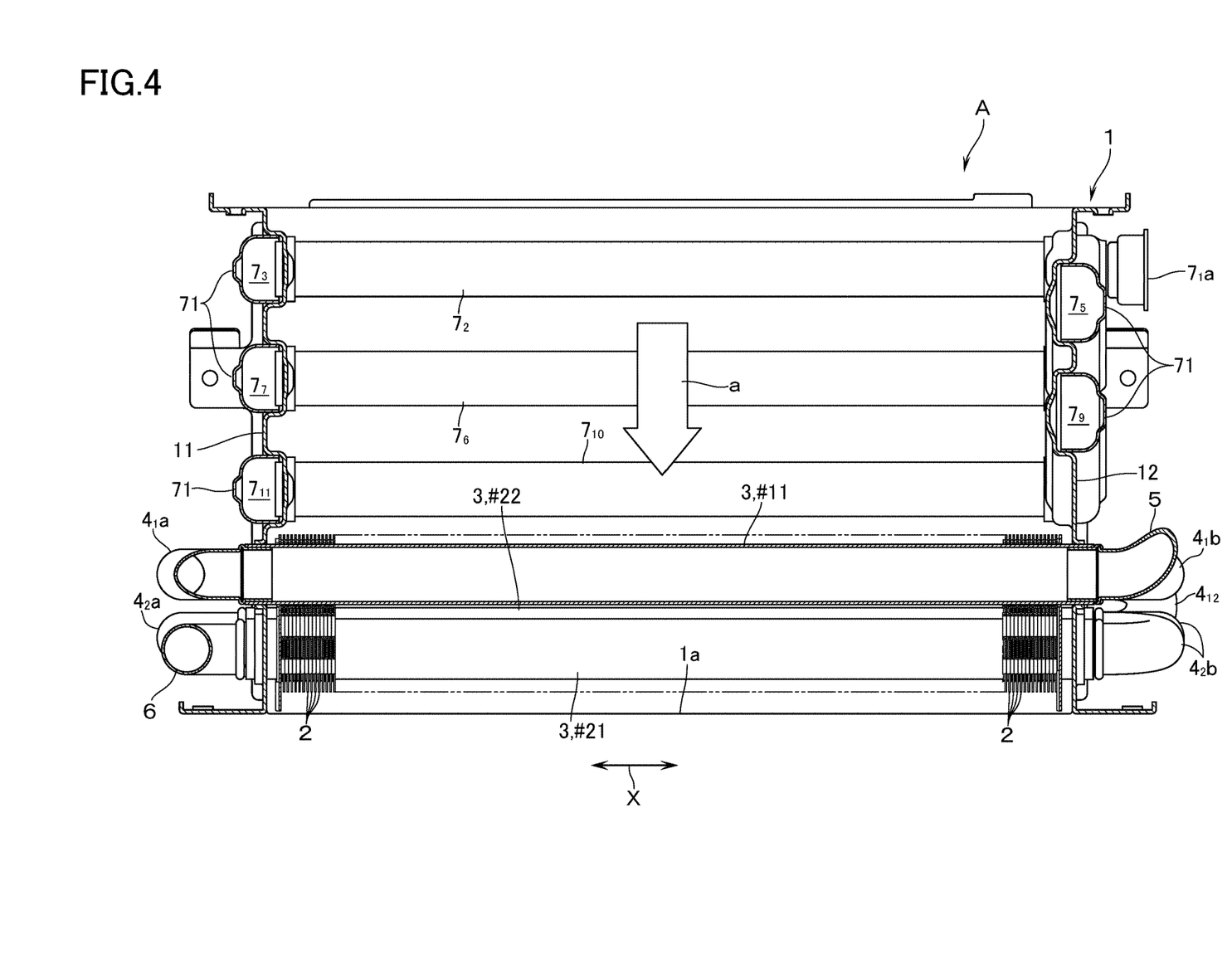
FIG. 4 is a cutaway side view cut along a IV-IV line.

Referring to FIGS. 1-4, a heat exchanger A of an embodiment of the invention includes a casing 1 having one end (an upper end in FIGS. 3, 4) on which a burner, not shown, is mounted. A combustion gas, as a heating fluid, generated by combustion of an air-fuel mixture discharged from the burner flows inside the casing 1, and the heat exchanger A is heated by the combustion gas. On a premise that two orthogonal directions crossing a flow direction of the combustion gas within the casing 1, which is shown by arrow "a" in FIGS. 3, 4, are defined as an X-axis direction and a Y-axis direction, respectively, the casing 1 has a rectangular cylindrical shape with side plates 11, 12 on both sides in the X-axis direction and side plates 13, 14 on both sides in the Y-axis direction. The heat exchanger A also includes a plurality of heat-absorbing fins 2 stacked and arranged in the X-axis direction in the casing 1, a plurality of heat-absorbing tubes 3 piercing through the heat-absorbing fins 2 and the side plates 11, 12 of both sides in the X-axis direction of the casing 1, and through which a fluid to be heated such as water or the like flows inside, and a connecting portion 4 connecting the heat-absorbing tubes 3 in series on an outer side of the side plates 11, 12 of both sides in the X-axis direction of the casing 1. Each of the heat-absorbing tubes 3 is brazed on each of the heat-absorbing fins 2 and the respective side plates 11, 12 in a piercing state.

The heat-absorbing tubes 3, as specified in FIG. 3, are divided into two stages and arranged in the flow direction of the combustion gas. In particular, six heat-absorbing tubes 3, i.e., #11-#16, from the heat-absorbing tube 3 positioned at an outermost side on one side in the Y-axis direction to the heat-absorbing tube 3 positioned at an outermost side on the other side in the Y-axis direction are arranged in a first stage which is a stage on an upstream side in the flow direction of the combustion gas, and five heat-absorbing tubes 3, i.e., #21-#25, from the heat-absorbing tube 3 positioned at the outermost side on the one side in the Y-axis direction to the heat-absorbing tube 3 positioned at the outermost side on the other side in the Y-axis direction are arranged in a second stage which is a stage on a downstream side in the flow direction of the combustion gas. Each of the heat-absorbing tubes 3 in the second stage is arranged with a positional relationship such that a Y-axis direction center of each of the heat-absorbing tubes 3 coincides with a Y-axis direction center between any two of the heat-absorbing tubes 3, 3 adjacent to each other in the first stage. Meanwhile, each of the heat-absorbing fins 2 is provided with each of swelling portions 21 at a Y-axis direction position coincident with each of the heat-absorbing tubes 3 in the first stage, which swells to the upstream side in the flow direction of the combustion gas. And then, each of the heat-absorbing tubes 3 in the first stage pierces through the respective swelling portions 21.

In addition, a meander passage in the first stage sequentially connecting the heat-absorbing tubes 3 in the first stage from the heat-absorbing tube 3 of #11 positioned at the outermost side on the one side in the Y-axis direction to the heat-absorbing tube 3 of #16 positioned at the outermost side on the other side in the Y-axis direction is configured by the six heat-absorbing tubes 3 in the first stage and a connecting portion $4_1$ for the first stage connecting the heat-absorbing tubes 3 in the first stage. A meander passage in the second stage connecting the heat-absorbing tubes 3 from the heat-absorbing tube 3 of #21 positioned at the outermost side on the one side in the Y-axis direction to the heat-absorbing tube 3 of #25 positioned at the outermost side on the other side in the Y-axis direction is configured by the five heat-absorbing tubes 3 in the second stage and a connecting portion $4_2$ for the second stage connecting the heat-absorbing tubes 3 in the second stage.

In this connection, the connecting portion $4_1$ for the first stage is configured by three U-shaped tubes $4_1 a$ and two U-shaped tubes $4_1 b$. The three U-shaped tubes $4_1 a$ connect the heat-absorbing tubes 3, 3 of #11 and #12, the heat-absorbing tubes 3, 3 of #13 and #14, and the heat-absorbing tubes 3, 3 of #15 and #16, respectively, which are disposed at an outer side of the side plate 11 on the one side in the X-axis direction of the casing 1. The two U-shaped tubes $4_1 b$ connect the heat-absorbing tubes 3, 3 of #12 and #13, and the heat-absorbing tubes 3, 3 of #14 and #15, respectively, which are disposed at an outer side of the side plate 12 on the other side in the X-axis direction of the casing 1. In addition, the connecting portion $4_2$ for the second stage is configured by two U-shaped tubes $4_2 a$ and two U-shaped tubes $4_2 b$. The two U-shaped tubes $4_2 a$ connect the heat-absorbing tubes 3, 3 of #22 and #23, and the heat-absorbing tubes 3, 3 of #24 and #25, respectively, which are disposed at the outer side of the side plate 11 on the one side in X-axis direction of the casing 1. The two U-shaped tubes $4_2 b$ connect the heat-absorbing tubes 3, 3 of #21 and #22, and the heat-absorbing tubes 3, 3 of #23 and #24, respectively, which are disposed at the outer side of the side plate 12 on the other side in the X-axis direction of the casing 1.

An inflow tube 5 is connected to the heat-absorbing tube 3 of #11, positioned at the outermost side on the one side in the Y-axis direction, i.e., at the upstream of the meander passage in the first stage, at the outer side of the side plate 12 on the other side in the X-axis direction of the casing 1. In addition, the heat-absorbing tube 3 of #16 at the downstream end positioned at the outermost side on the other side in the Y-axis direction of the meander passage in the first stage is connected to the heat-absorbing tube 3 of #25 at the upstream end positioned at the outermost side on the other side in the Y-axis direction of the meander passage in the second passage at the outer side of the side plate 12 on the other side in the X-axis direction of the casing 1 through an intermediate connecting portion $4_{12}$ consisting of a U-shaped tube, allowing the fluid to be heated to flow from the meander passage in the first stage to the meander passage in the second stage. Further, an outflow side joint 6 having an outflow port 6a at an end portion thereof is connected to the heat-absorbing tube 3 of #21 at the downstream end positioned at the outermost side on the one side in the Y-axis direction of the meander passage in the second stage at the outer side of the side plate 11 on the one side in the X-axis direction of the casing 1. Thus, the connecting portion 4 which connects all of the heat-absorbing tubes 3 in series is made up of the connecting portion $4_1$ for the first stage, the connecting portion $4_2$ for the second stage, and the intermediate connecting portion $4_{12}$.

Referring to FIG. 3, three cooling passages $7_4$, $7_8$, $7_{12}$ of a fourth, an eighth, and a twelfth, which consist of a tube and are arranged subsequentially from the upstream side of the flow direction of the combustion gas, are disposed at an inner side of a portion of the side plate 13 on the one side in the Y-axis direction of the casing 1, which is positioned at a more upstream side of the flow direction of the combustion gas than each of the heat-absorbing fins 2 so as to come into contact with the side plate 13. Three cooling passages $7_2$, $7_6$, $7_{10}$ of a second, a sixth, and a tenth, which consist of a tube and are arranged subsequentially from the upstream side of the flow direction of the combustion gas, are disposed at an inner side of a portion of the side plate 14 on the other side in the Y-axis direction of the casing 1, which is positioned at the more upstream side of the flow direction of the combustion gas than each of the heat-absorbing fins 2 so as to come into contact with the side plate 14. In addition, as shown in FIGS. 1, 4, a third cooling passage $7_3$ connecting the second cooling passage $7_2$ and the fourth cooling passage $7_4$, a seventh cooling passage $7_7$ connecting the sixth cooling passage $7_6$ and the eighth cooling passage $7_8$, and an eleventh cooling passage $7_{11}$ connecting the tenth cooling passage $7_{10}$ and the twelfth cooling passage $7_{12}$ are provided at a portion of the side plate 11 on the one side in the X-axis direction of the casing 1, which is arranged at the more upstream side in the flow direction of the combustion gas than each of the heat-absorbing fins 2. Moreover, as shown in FIGS. 2, 4, a first cooling passage $7_1$ which is connected to the second cooling passage $7_2$ and at an end portion of which an inflow port $7_1 a$ through which the fluid to be heated flows is provided, a fifth cooling passage $7_5$ connecting the fourth cooling passage $7_4$ and the sixth cooling passage $7_6$, and a ninth cooling passage $7_9$ connecting the eighth cooling passage $7_8$ and the tenth cooling passage $7_{10}$ are provided at a portion of the side plate 12 on the other side in the X-axis direction of the casing 1, which is arranged at the more upstream side in the flow direction of the combustion gas than each of the heat-absorbing fins 2. The heat-absorbing tube 3 of #11 at the upstream side of the meander passage in the first stage is connected to the twelfth cooling passage $7_{12}$ through the inflow tube 5. Therefore, the fluid to be heated flows in the heat-absorbing tube 3 of #11 at the upstream end of the meander passage in the first stage from the inflow port $7_1 a$ through the first to the twelfth passages $7_1$-$7_{12}$. This arrangement allows each of the side plates 11-14 of the casing 1 to be cooled by the fluid to be heated flowing in the first to the twelfth cooling passages $7_1$-$7_{12}$.

Meanwhile, each of the third, seventh, and eleventh cooling passages $7_3$, $7_7$, $7_{11}$, as well as each of the first, fifth, and ninth cooling passages $7_1$, $7_5$, $7_9$ is configured by a concaved portion in the Y-axis inward direction formed at each of the side plates 11, 12, and a cover 71 mounted on an outer surface of each of the side plates 11, 12 to cover the concaved portion. In addition, a plurality of holes 131 into which ignition electrodes, flame rods, or the like are inserted are formed in the side plate 13 on the one side in the Y-axis direction of the casing 1.

Figure 5:
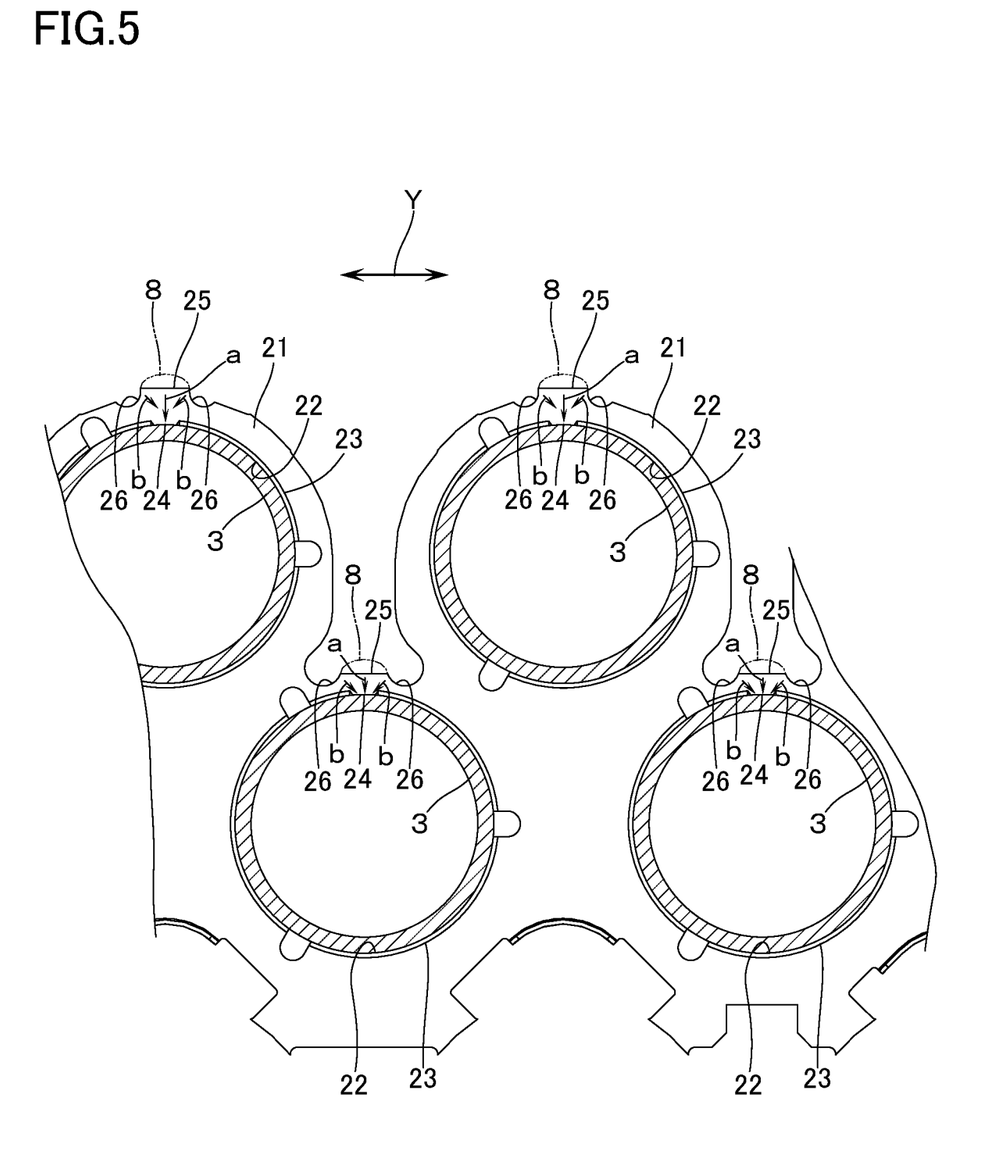
FIG. 5 is an enlarged view of one portion of FIG. 3.
Figure 6:
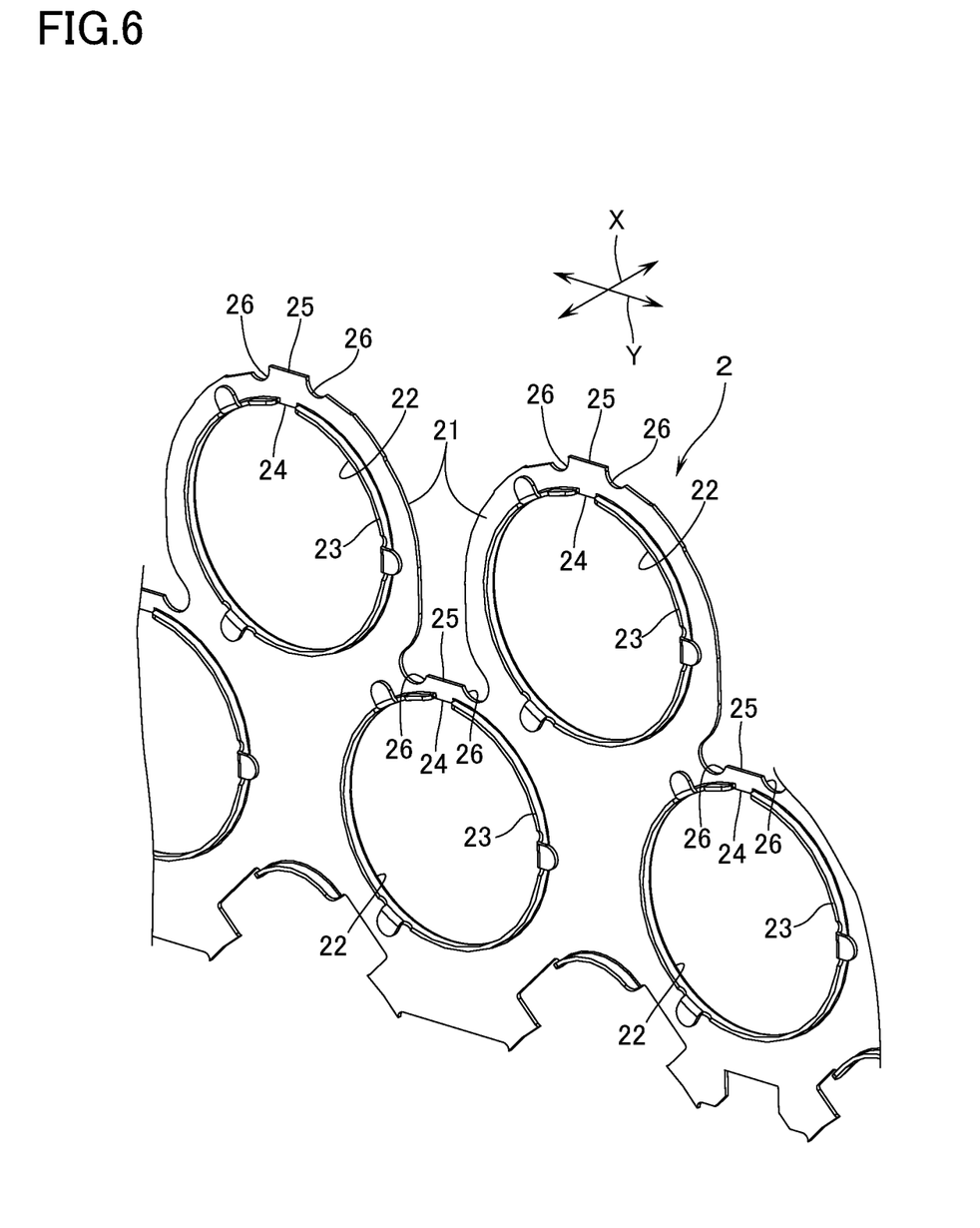
FIG. 6 is an enlarged perspective view of one portion of each of heat-absorbing fins provided with the heat exchanger of the embodiment.

Next, configuration for brazing each of the heat-absorbing fins 2 and the respective heat-absorbing tubes 3 will be described. Referring to FIGS. 5, 6, through holes 22, which are opened in each of the heat-absorbing fins 2 and through each of which the corresponding heat-absorbing tube 3 pierces, are configured by a burring processed hole with which a burring wall 23 protruding from a hole edge of each of the through holes 22 and extending in the X-axis direction is provided. A portion of each of the through holes 22, positioned at the upstream side in the flow direction of the combustion gas, is formed into a missing portion 24 at which a part of the burring wall 23 is removed. In addition, brazing material holding portions 25, each of which holds a brazing material 8 and is positioned adjacent to the missing portion 24 in the flow direction of the combustion gas, are provided with each of the heat-absorbing fins 2. Further, when the brazing material 8 is caused to melt under a condition where each of the brazing material holding portions 25 is positioned above the corresponding through whole 22, each of the heat-absorbing fins 2 and the corresponding heat-absorbing tube 3 are brazed by penetrating a molten brazing material flowing down from each of the brazing holding portions 25 between each of the burring walls 23 and the corresponding heat-absorbing tube 3 through the respective missing portions 24.

Here, each of the brazing material holding portions 25 is extended above the corresponding missing portion 24 at a predetermined distance under the condition where each of the brazing material holding portions 25 is positioned above the corresponding through hole 22. Further, each of the brazing material holding portions 25 is formed so that the applied paste brazing material 8 is held across approximately entire width in the Y-axis direction of each of the brazing material holding portions 25. Meanwhile, in the embodiment, though each of the brazing material holding portions 25 is flat across the entire width in the Y-axis direction, a concaved portion may be formed in a part of the respective brazing material holding portions 25. In addition, notched portions 26, 26 positioned on both sides in the Y-axis direction of each of the brazing material holding portions 25 are formed at the respective heat-absorbing fins 2. Each of the notched portions 26 is notched so as to concave downward beneath the corresponding brazing material holding portion 25 and portions of each of the heat-absorbing fins 2 adjacent on the outer sides in the Y-axis-direction of the respective notched portions 26, under the condition where each of the brazing material holding portions 25 is positioned above the corresponding through hole 22.

Following the application of the brazing material 8 to each of the brazing material holding portions 25, the brazing process is carried out in a furnace. During this process, the molten brazing material flows down from a central part in the Y-axis direction of each of the brazing material holding portions 25, flowing towards each of the missing portions 24 as indicated by arrow "a" in FIG. 5. In addition, the molten brazing material flows from each side part in the Y-axis direction of the respective brazing material holding portions 25, having a directional component away from a side edge on each side of the respective notched portions 26, i.e., towards the inner side in the Y-axis direction. Then, the flowing molten brazing material approaches just below a central part in the Y-axis direction of each of the brazing material holding portions 25, as indicated by arrow "b" in FIG. 5. As a result, there is an increased proportion of the molten brazing material flowing down into the corresponding missing portion 24 positioned beneath the respective brazing material holding portions 25. Accordingly, a reduction in cost can be achieved through a decrease in the quantity of the brazing material 8.

In addition, in the embodiment, a width in the Y-axis direction of each of the missing portions 24 is narrower than that of each of the brazing material holding portions 25. Here, in a case where the Y-axis direction does not become horizontal but is inclined during brazing in the furnace, the molten brazing material, which has flowed down into each of the missing portions 24, is biased towards a downhill grade side. On the other hand, in a case where the width in the Y-axis direction of each of the missing portions 24 is wider than that of each of the brazing material holding portions 25, the molten brazing material deviates from the burring wall 23 adjacent on an uphill grade side (for example, on a left side in the case where the Y-axis direction is inclined downward to the right in FIG. 5) of each of the missing portions 24. This result in the molten brazing material failing to penetrate between each of the burring walls 23 and the respective heat-absorbing tubes 3, leading to a brazing defect. On the contrary, in the case where the width in the Y-axis direction of each of the missing portions 24 is narrower, as aforementioned, it is difficult for the molten brazing material to deviate from the burring wall 23 adjacent on the uphill grade side of each of the missing portions 24, and the brazing defect can be suppressed. In this connection, even though the width in the Y-axis direction of each of the missing portions 24 is made to be narrower, since the molten brazing material flowing down from each of the brazing material holding portions 25 flows to approach just below the central part in the Y-axis direction of each of the brazing material holding portions 25, the quantity of the brazing material flowing down into each of the missing portions 24 is not decreased.

Figure 7A:
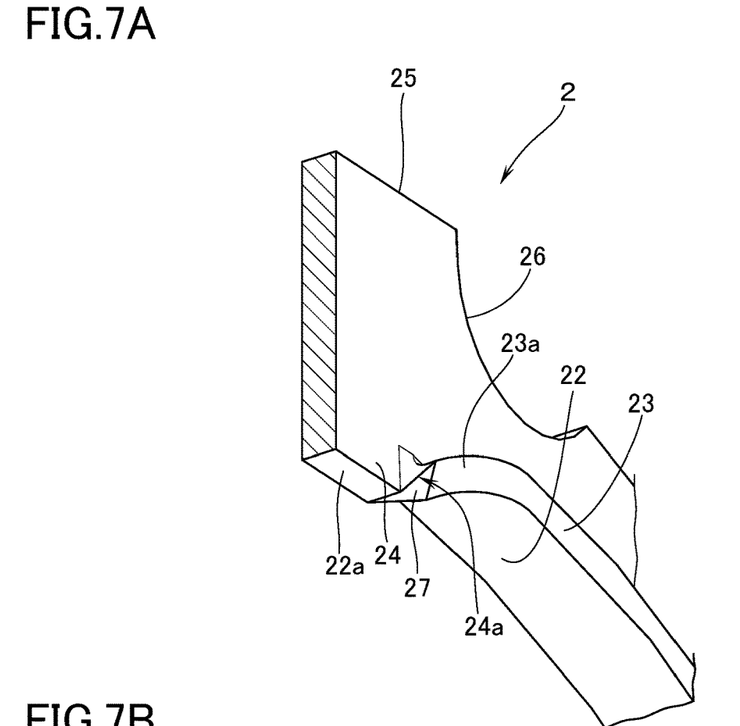
FIG. 7A is an enlarged perspective view of a corner portion of each of missing portions of the heat-absorbing fins provided with the heat exchanger of the embodiment.
Figure 7B:
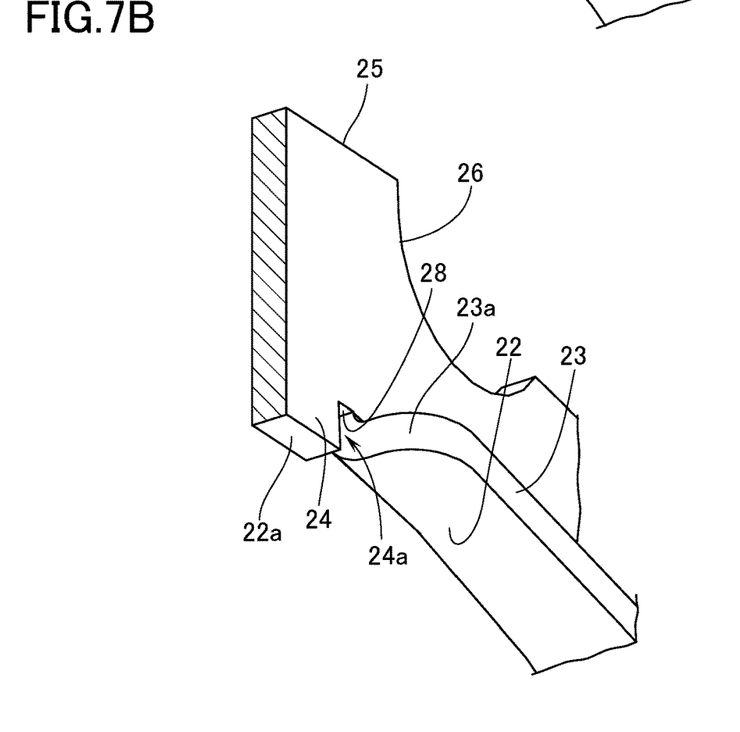
FIG. 7B is an enlarged perspective view of a corner portion of each of missing portions of the heat-absorbing tubes of a comparative example.

Further, in the embodiment, as shown in FIG. 7A, a continuous surface 27 which continues and is twisted from a circumferential surface portion 22a of each of the through holes 22 opposite to a peripheral surface of the respective heat-absorbing tubes 3 at each of the missing portions 24 to a side surface 23a in the Y-axis direction of the burring wall 23 facing to the corresponding missing portion 24 is present at a corner portion 24a on each side in the Y-axis direction of the respective missing portions 24. Here, in the presence of the twisted continuous surface 27, loads on the burring process increase. Therefore, in usual, as shown in FIG. 7B, a concaved notched portion 28, which isolates the aforementioned circumferential surface portion 22a of each of the through holes 22 from the aforementioned side surface 23a in the Y-axis direction of the burring wall 23, is formed at a corner portion 24a on each side in the Y-axis direction of the respective missing portions 24. However, in the presence of the concaved notched portion 28, a part of the molten brazing material, which has flowed down into each of the missing portions 24, enters the concaved notched portion 28 and remains therein, and the quantity of the molten brazing material penetrating between each of the burring walls 23 and the respective heat-absorbing tubes 3 is reduced. On the contrary, with the aforementioned twisted continuous surface 27 and without forming the concaved portion 28 at the corner portion 24a on each side in the Y-axis direction of the respective missing portions 24, the reduction in the quantity of the molten brazing material penetrating between each of the burring walls 23 and each the respective heat-absorbing tubes 3, caused by the flow into the concaved notched portion 28, is prevented, offering an advantage.

Though the embodiment of the invention is explained with reference to the drawings, the invention is not limited to the embodiment. For example, in aforementioned embodiment, while a portion of each of the through holes 22 positioned on the upstream side in the flow direction of the combustion gas is formed into the missing portion 24, it is also possible that a portion of each of the through holes 22 positioned on the downstream side in the flow direction may be formed into the missing portion 24. In addition, in the aforementioned embodiment, although the combustion gas is used as the heating fluid to heat the heat exchanger A, the invention is similarly applicable to the heat exchangers using fluids other than the combustion gas as the heating fluid.

EXPLANATION OF SYMBOLS

A Heat exchanger
1 Casing
2 Heat-absorbing fin
22 Through hole
23 Burring wall
24 Missing portion
24a Corner portion on each side in Y-axis direction of missing portion
25 Brazing material holding portion
26 Notched portion
27 Continuous surface
3 Heat-absorbing tube
8 Brazing material

What is claimed is:

1. A heat exchanger assembly before brazing to be heated by a heating fluid, comprising:
   a box-shaped casing through which the heating fluid flows inside;
   on a premise that two orthogonal directions, intersecting a flow direction of the heating fluid within the casing, are defined as an X-axis direction and a Y-axis direction, respectively;
   a plurality of heat-absorbing fins stacked and arranged in the X-axis direction inside the casing; and
   a plurality of heat-absorbing tubes piercing through each of the heat-absorbing fins in the X-axis direction and through side plates on both sides in the X-axis direction of the casing, and through which a fluid to be heated flows insides,
   wherein through holes that are opened in each of the heat-absorbing fins and through each of which a corresponding heat-absorbing tube pierces are configured by a burring processed hole with which a burring wall protruding in the X-axis direction from a hole edge of each of the through holes is provided,
   wherein each of portions positioned at one side on both of upstream and downstream sides in the flow direction of the heating fluid of the respective through holes is formed into a missing portion at which a part of the burring wall has been removed,
   wherein each of the heat-absorbing fins is provided with brazing material holding portions positioned adjacent to the corresponding missing portion in the flow direction of the heating fluid, and
   wherein each of the brazing material holding portions is positioned above the corresponding through hole, and formed, in a state before brazing, to hold a brazing material with substantially the entire width in the Y-axis direction by extending above the corresponding missing portion at a predetermined distance, such that when melted, a molten brazing material is guided and penetrates between each of the burring walls and corresponding the heat-absorbing tube through the respective missing portions,
   wherein:
      each of the heat-absorbing fins is provided with a notched portion positioned on each side in the Y-axis direction of the respective brazing material holding portions, and
      the notched portion, being positioned relative to each brazing material holding portion, is formed to concave downward beneath the corresponding brazing material holding portion and portions of each of the heat-absorbing fins directly adjacent on outer sides in the Y-axis direction of the respective notched portions.

2. The heat exchanger as claimed in claim 1, wherein a continuous surface which continues and is twisted over a side surface in the Y-axis direction of each of the burring walls, which faces to the corresponding missing portion from a circumferential surface portion opposite to a peripheral surface of each of the heat-absorbing tubes at the corresponding missing portion, is present at a corner portion on each side in the Y-axis direction of the corresponding missing portion.

3. The heat exchanger as claimed in claim 1, wherein a width in the Y-axis direction of each of the missing portions is narrower than that of each of the brazing material holding portions.

* * * * *